United States Patent [19]
Bruning

[11] 3,991,807
[45] Nov. 16, 1976

[54] TEMPORARY DOOR INSTALLATION FOR GRAIN-CARRYING FREIGHT CAR

[75] Inventor: William E. Bruning, Omaha, Nebr.

[73] Assignee: OMNI Railway Equipment Limited, Valley, Nebr.

[22] Filed: July 23, 1975

[21] Appl. No.: 598,172

[52] U.S. Cl. ............................. 160/113; 160/368 G
[51] Int. Cl.² ......................................... E06B 5/00
[58] Field of Search ................ 160/113, 368 G, 368

[56] References Cited
UNITED STATES PATENTS

| | | | |
|---|---|---|---|
| 2,830,659 | 4/1958 | Gerrard | 160/368 G X |
| 2,915,117 | 12/1959 | Ford | 160/368 G X |
| 2,971,579 | 2/1961 | Webster | 160/368 G |
| 3,096,814 | 7/1963 | Ford et al. | 160/368 G X |
| 3,149,664 | 9/1964 | Keating | 160/368 G X |
| 3,216,483 | 11/1965 | Ford | 160/368 G |

*Primary Examiner*—Philip C. Kannan
*Attorney, Agent, or Firm*—Dawson, Tilton, Fallon & Lungmus

[57] ABSTRACT

A temporary door installation for a grain-carrying freight car wherein steel strapping of the character used in the temporary doors themselves is employed for a cross-tie and reinforced by wooden vertical members on the outside of the temporary doors.

4 Claims, 4 Drawing Figures

U.S. Patent  Nov. 16, 1976  3,991,807
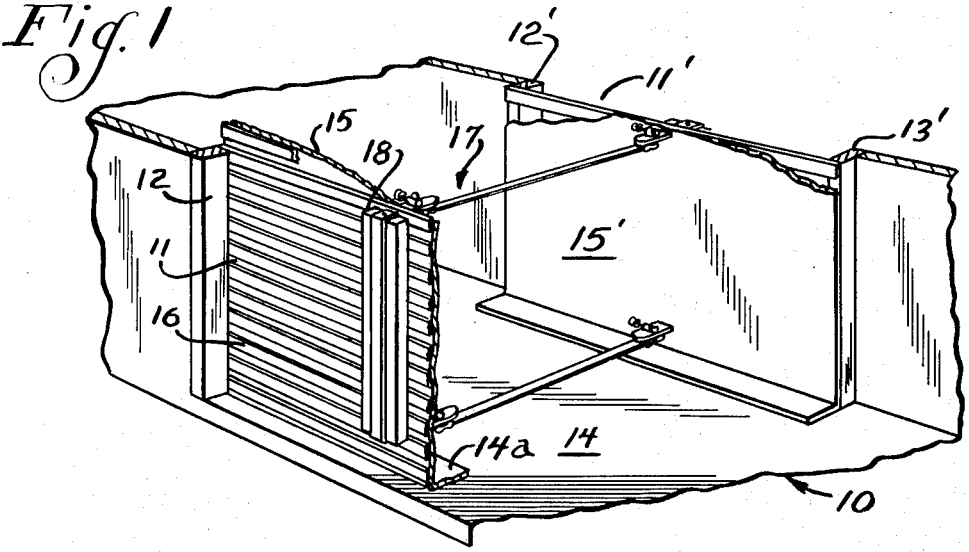
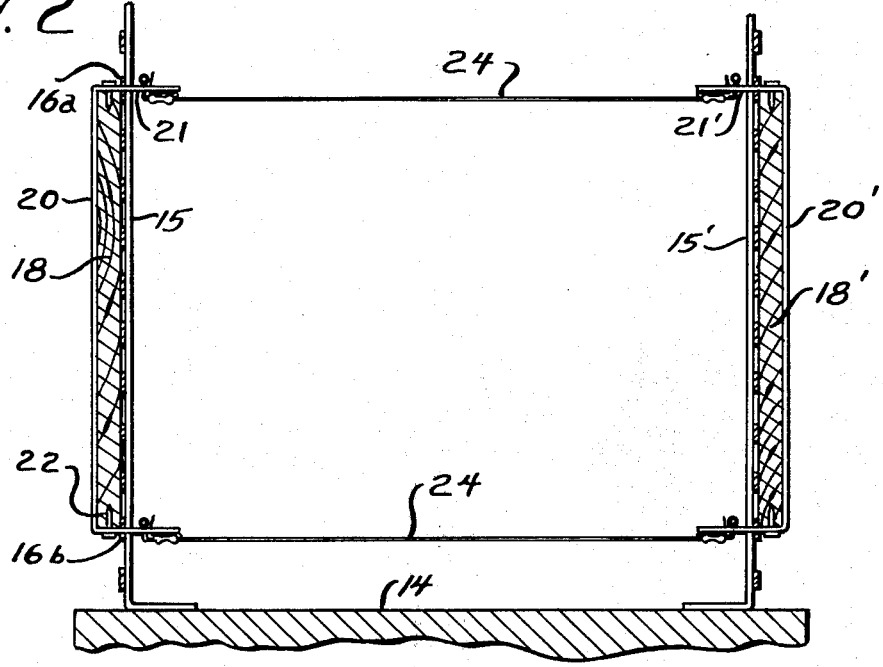
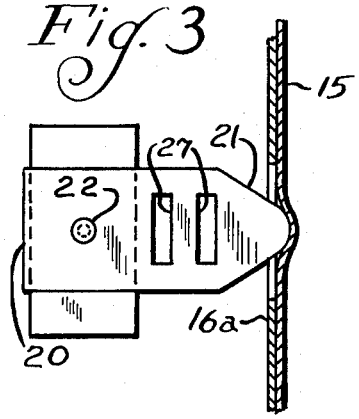
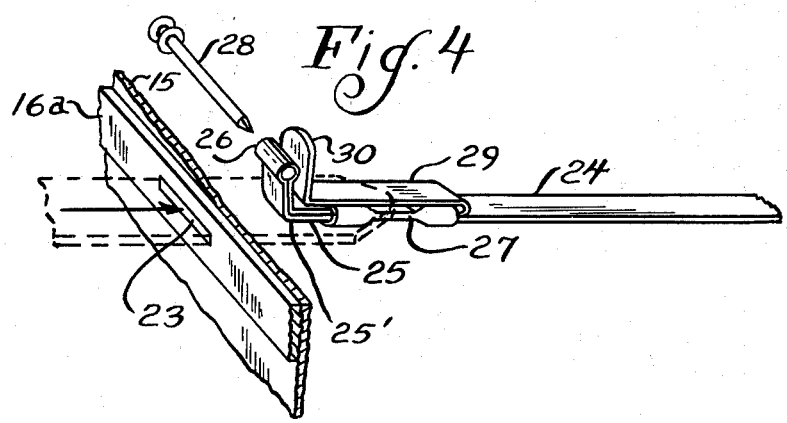

TEMPORARY DOOR INSTALLATION FOR GRAIN-CARRYING FREIGHT CAR

BACKGROUND AND SUMMARY OF INVENTION

This invention relates to a temporary door installation for a grain-carrying freight car, and, more particularly, to one that is bolstered centrally of each door by a cross-tie assembly. As such, the invention herein can be considered an improvement on the assembly seen in U.S. Pat. No. 2,915,117. Other patents showing center-bolstered cross-ties are 2,855,992; 3,021,897; 3,096,814; and 3,216,483. Thus, the art is fairly well developed — it being appreciated by the workers in this art that the large horizontal extent of a relatively flexible paperboard door (even when reinforced by steel strapping) can be benefitted through the use of further bolstering — as by cross-tying the opposed temporary doors together. This, in effect, cuts down the unsupported length by one half.

Difficulties in the prior art expedients have arisen primarily in the areas of the temporary doors that have to be punctured in order to fasten the cross-ties. This, I overcome in a unique fashion by providing a horizontally extending slot in the supporting strap, and thread through this slot a length of similar type strapping which provides the cross-tie. The outboard side of the door — the side to which the cross-tie is anchored — is advantageously reinforced by a vertical wooden member. The foregoing arrangement makes possible an economical and compact kit to be furnished to the railroads; yet one, when installed, that is highly reliable in preventing premature or unexpected failure of the temporary barricades.

Further objects and advantages of the invention may be seen in the details of the ensuing specification.

DETAILED DESCRIPTION

The invention is described in conjunction with the illustrative embodiment in the accompanying drawing, in which:

FIG. 1 is a fragmentary perspective view of a grain-carrying freight car equipped with a temporary door installation constructed according to the teachings of this invention;

FIG. 2 is a fragmentary vertical sectional view taken in a plane transverse of the length of the freight car seen in FIG. 1;

FIG. 3 is a fragmentary top plan view of one of the connections seen in FIG. 2; and FIG. 4 is a fragmentary perspective view showing various parts in the positions just prior to assembling.

In the illustration given, and with reference to FIG. 1, the numeral 10 designates generally a grain-carrying freight car which is seen to include the usual doorways 11 and 11'. The doorway 11, for example, is defined in part by vertically extending side door posts, one of which is designated 12. Relative to the doorway 11', the counterpart door posts are designated 12' and 13'. Also, in conventional fashion, each doorway is defined in part by a floor 14 and a wall portion at the top (not shown).

Positioned across each door is a temporary barricade 15 or 15' as the case may be. The doors are advantageously constructed of corrugated paperboard suitably creased to provide the usual floor flap as at 14a relative to the door 15, and is backed by a plurality of horizontally extending, vertically spaced-apart flat steel straps as at 16. As indicated previously, certain of these straps are slotted to cooperate with the cross-tie assembly generally designated 17. For example, relative to the door 15 (see the left hand portion of FIG. 2), we have designated the upper strap which cooperates with the cross-tie assembly 16a, and the lower strap as 16b. In the installation given wherein each door 15 is equipped with twelve horizontally extending straps, I employ the second and the eleventh strap (counting from the bottom for the purpose of cooperating with the cross-tie assembly 17.

Providing a bolster for each door is a vertically extending elongated wooden member as at 18 or 18', as the case may be, relative to the doors 15 and 15'. These, in effect, bolster or back up each door on the outside thereof, as can be appreciated readily from a comparison of FIGS. 1 and 2. The wooden members 18 and 18' are maintained in position by strap means (here shown as a loop) which passes across the car, down one wooden member, across the car again, and then on the opposite wooden member. More specifically, I employ a length of strapping 20 (or 20') for each wooden member 18 or 18'. This is the length or run that is disposed vertically, and, at the ends, is turned inwardly to provide a penetrating tang portion as at 21 (see FIG. 3).

In FIG. 3, the view can be considered as looking downwardly on the top of the wooden member 18, and it will be noted that the vertical strapping 20 with the horizontally disposed ends 21 is secured to the ends of the wooden member 18 by means of a suitable nail 22 (see also the lower left hand portion of FIG. 2 where a similar nail at the other end of the member 18 is also designated 22).

Inwardly directed end portion 21 of the strapping length 20 is tapered as at 21 to facilitate threading through the slot 23 in the strap 16a, and also to puncture the corrugated paperboard medium of the door 15. In FIG. 3, the puncture is almost complete, and it will be appreciated that the strap has substantial area around the slot 23 (see FIG. 4) so that grain is restrained from leaking out of the puncture in the door 15.

Referring now to FIG. 4, it will be seen that an additional strapping length 24 is provided which connects the ends 21 of the strapping length 20 with the ends 21' of the strapping length 20'. In the illustration given, the strapping 24 is folded on itself at each end as at 25 to form a loop 26. The folded portion 25 is cinched in place by means of a strapping seal or clip 27.

To cooperate with the loop 26 provided in the cross-tie strap 24, I equip the stub portion 21 of the wooden member strapping 20 with spaced-apart openings as at 27. This permits selective insertion therethrough of the loop 26, and fastening thereof with nail 28 to provide the assembly seen in FIGS. 1 and 2.

In the practice of one preferred form of the invention, a 2 inches × 4 inches board is used as the upright wooden member 20 or 20'. This member is reinforced with a length of 1¼" ×0.50 steel strapping long enough to support the longest dimension of the 2 inches ×4 inches wooden member, and then bent inwardly to form a tang-like projection 21 to puncture the grain door and provide the connecting link to the transverse cross member 24. The tang penetrates the grain door 15 or 15' only after passing through a pre-punched slot 23 in the center of the second and eleventh straps on the grain door. The slot indicates the precise location of the cross-tie brace, but, more importantly, prevents the tang from moving laterally, which might cause a tear on the grain door.

In the preferred embodiment, the 2 inches × 4 inches boards 20 or 20' are reinforced by the steel strapping and, in the illustration given, is 46 inches long, so that no difficulty is encountered during installation, i.e., the bent ends 21 of the strapping 20 line up exactly with the slots centered in the straps 16a and 16b. The use of 1¼ inches × 0.50 strapping makes possible a sufficiently flexible strapping to permit adjustment, yet stiff enough to permit easy penetration of the corrugated medium making up the door 15. As indicated in the drawing, the taper at 21 is sufficiently sharp to permit ease of penetration without being so sharp as to cause injury.

As far as the cross member 24 is concerned, an advantageous material of construction is strapping ⅞ inches wide × 0.23 inches in thickness, which insures the correct amount of tension required to properly support a load of grain (not shown). In practice, the loop 26 is selectively inserted through one of the slots 27 to give the desired length or tension. The use of two slots, spaced 1 inch apart, is to yield the desired adjustment required due to the different widths of boxcars. The large majority of cars have a width of 9'–2" but a few of the newer cars have widths of 9'–4". The predetermined length of the cross member yields, counting the length of the tang, a cross support of 9'–2" when the slots closer to the grain door are used and 9'–4" when the two more remote slots are employed.

To construct the cross tie member which in effect is a further strapping length to that provided at 20 or 20', a loop may be formed in the ¾ inch wide strapping 24 in a machine operation afterwhich the folded portion is bent as at 25' (see the central portion of FIG. 4). This facilitates easy insertion of the loop 26 through whichever of the slots 27 is selected. Further, the upward bend developed by the bend 25' provides clearance for the strapping seal 27 and the return bend portion 29. The return bend portion 29 is folded at its extreme end as at 30 to also extend through the slot 27 which serves to impart a biasing or spring-like action on the loop 26 and hold the same in place. It will be appreciated that once the loop 26 and end 30 have been inserted through the slot 27, it is a relatively easy matter to then insert a nail 28 through the loop to prevent the loop from dropping back through the slot. In practice, the nail fits loosely through the loop until the car is loaded and to prevent the possibility that the nail would be vibrated out of the loop if the car were moved between the time it was coopered and the time it was loaded the loose end 30 of the strap forms a natural spring action which locks the nail against the top surface of the tang-like portion 21.

I claim:

1. A temporary door installation for a grain-carrying freight car wherein the freight car has opposed doorways defined by vertical door posts and a floor, a temporary door panel extending across each doorway and being equipped with a plurality of vertically spaced-apart horizontally extending flat metal straps secured to said door posts, and a cross-tie assembly comprising an elongated wooden member positioned on the outside center of each door panel with its length extending vertically, said wooden member having its ends in alignment with two of said straps on its associated door panel, each of said two straps being equipped with a horizontally extending slot centrally disposed therein, and strap means connecting said wooden members at the ends thereof and extending through said slot.

2. The installation of claim 1 in which said strap means includes a length of strapping for each end of each wooden member and secured thereto, each length of strapping having a tapered end disposed interiorly of said freight car and adjacent its associated wooden member, and further strapping length extending horizontally across said car aligned with the top and bottom of each wooden member, and means connecting said lengths of strapping with said further strapping lengths.

3. The installation of claim 2 in which said connecting means includes a loop formed on each of said further strapping lengths, a slot in each length of strapping adjacent end, said loop being received in said slot, and nail means extending through said loop and bearing against said length of strapping to releasable latch said length of strapping and further strapping length.

4. The structure of claim 3 in which said further strapping length is equipped with an integral free end folded on said further strapping length to bias said loop and nail means against said length of strapping to prevent vibratory dislodgement of said nail means.

* * * * *